(12) United States Patent
Mohapatra (10) Patent No.: US 11,176,375 B2
(45) Date of Patent: Nov. 16, 2021

(54) SMART GLASSES LOST OBJECT ASSISTANCE

(71) Applicant: Sony Corporation, Tokyo (JP)

(72) Inventor: Bibhudendu Mohapatra, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/814,889

(22) Filed: Mar. 10, 2020

(65) Prior Publication Data

US 2021/0287002 A1     Sep. 16, 2021

(51) Int. Cl.
| | |
|---|---|
| *G06K 9/00* | (2006.01) |
| *G02B 27/01* | (2006.01) |
| *G06K 9/32* | (2006.01) |
| *G06T 7/73* | (2017.01) |
| *G06T 19/00* | (2011.01) |
| *G08B 21/24* | (2006.01) |
| *G06F 16/538* | (2019.01) |

(52) U.S. Cl.
CPC ..... *G06K 9/00671* (2013.01); *G02B 27/0172* (2013.01); *G06F 16/538* (2019.01); *G06K 9/3266* (2013.01); *G06T 7/74* (2017.01); *G06T 19/006* (2013.01); *G08B 21/24* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 6,377,296 B1 | 4/2002 | Zlatsin et al. | |
| 10,339,497 B2 | 7/2019 | Gabbai | |
| 2016/0377870 A1* | 12/2016 | Pilkinton | G02B 27/0172 345/8 |
| 2017/0262150 A1* | 9/2017 | Wong | G02B 27/017 |
| 2019/0236530 A1 | 8/2019 | Cantrell et al. | |
| 2019/0392830 A1* | 12/2019 | Abdollahian | G02B 27/017 |
| 2020/0117902 A1* | 4/2020 | Wexler | G06T 7/0002 |
| 2020/0319457 A1* | 10/2020 | Jenabzadeh | A61B 5/4094 |

FOREIGN PATENT DOCUMENTS

GB     2517944 A     3/2015

OTHER PUBLICATIONS

Boldt, Robin,"The Last-Seen Image: an Image-Based Approach for Finding Lost Objects Using a Head-Mounted Display", May 6, 2014, Institute for Visualization and Interactive Systems, University of Sttutgart.

* cited by examiner

*Primary Examiner* — Michelle Chin
(74) *Attorney, Agent, or Firm* — John L. Rogitz (57) ABSTRACT

An assembly includes a head mount such as smart glasses wearable on a head of a user. An imager is on the head mount and is configured to generate images of objects. A processor accesses the images responsive to a query and presents images of objects on a display of the head mount to assist the user in identifying, for example, where a lost object was last seen.

18 Claims, 6 Drawing Sheets

SMART GLASSES LOST OBJECT ASSISTANCE

FIELD

The application relates generally to smart glasses assistance in finding lost objects.

BACKGROUND

By some estimates, a person spends approximately two and half days per year searching for lost objects, and approximately $2.7 billion is spent annually in replacing lost objects.

SUMMARY

Accordingly, present principles provide an assembly that includes at least one head mount wearable on a head of a user. At least one imager on the head mount is configured to generate images of objects. At least one processor is configured with instructions to access the images responsive to a query and to present a first image of at least a first object on at least one display of the head mount.

In example embodiments, the query is for the first object, and the instructions are executable to identify at least a second image of at least a second object responsive to the query for the first object. The instructions also can be executable present the second image on the display along with the first image.

In some implementations, the instructions can be executable to correlate images with respective timestamp, and to identify the second image at least in part based on a timestamp of the second image being within a first time period of a timestamp of the first image. In other implementations, the instructions may be executable to correlate images with respective locations, and to identify the second image at least in part based on a location of the second image being proximate a location of the first image. The instructions may be executable to determine the second location is proximate the first location at least in part based on the second location being within a first distance of the first location. The instructions may be executable to determine the second location is proximate the first location at least in part based on the first and second images sharing at least one similarity. The similarity may include an image of a third object.

In another aspect, an assembly includes at least one head mount wearable on a head of a user. At least one imager on the head mount is configured to generate images. Also, at least one processor is configured with instructions to access the images, execute text recognition on at least some of the images, and based at least in part on the text recognition, identify at least one application to process text.

In another aspect a method includes receiving a query for a first object, and responsive to the query, presenting an image of the first object on a head-mounted display. The method also includes, responsive to the query, presenting an indication of a location of the first object.

The details of the present application, both as to its structure and operation, can best be understood in reference to the accompanying drawings, in which like reference numerals refer to like parts, and in which:

DETAILED DESCRIPTION

In overview, a user's memory of where he may have last encountered a lost object is triggered by showing the user images of a few objects around the object when last seen, as well as the object itself.

As the wearer of smart glasses goes through his day, images are taken by a camera on the glasses and stored. For example, images are stored when the wearer is looking at an application such as email, messenger, etc. on a display. The images are analyzed for object/text recognition using, for example, machine learning and if desired reminders entered into an electronic calendar. An alert may be generated that such an entry has been made.

Thus, in general smart glasses are used as part of a computerized personal assistant device/system to help users, including assisting users in locating misplaced objects using computer vision and artificial intelligence (AI)/machine learning (ML) techniques. As the wearer/user progresses through a day, the smart glasses capture images and stores them in a medium constantly. AI-ML techniques may be used to identify the objects (or text) and actions done on the objects.

For example, if a green cup is stored in a closet, the system creates a map that associates the image of the green cup with multiple objects around the green cup in a timeline before and after the green cup was last imaged. When the user thinks about the green cup at some point in the future, he may speak "green cup" to so indicate, which precipitates a visualization of, e.g., twenty objects presented to the user on the smart glasses. Further, the system can disambiguate situations in which, to continue the example, two green cups were imaged at different places. This may be done by checking environment and timestamps. This enables the user to locate the green cup immediately.

This disclosure relates generally to computer ecosystems including aspects of consumer electronics (CE) device networks such as but not limited to smart glasses and smart (computerized) vehicles. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
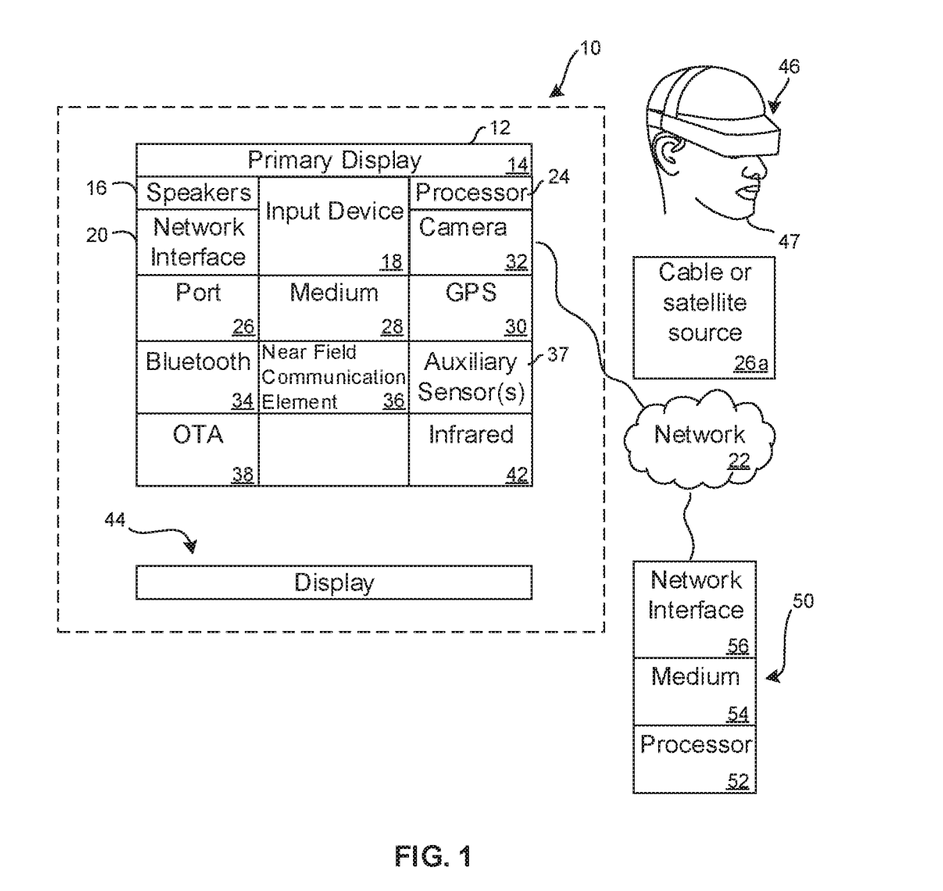
FIG. 1 illustrates an example assembly consistent with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones.

For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be included in or integrated with a vehicle while a second CE device 46 may be implemented as head-mounted viewing device such as smart glasses. All devices in FIG. 1 may communicate with each other. A computerized device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
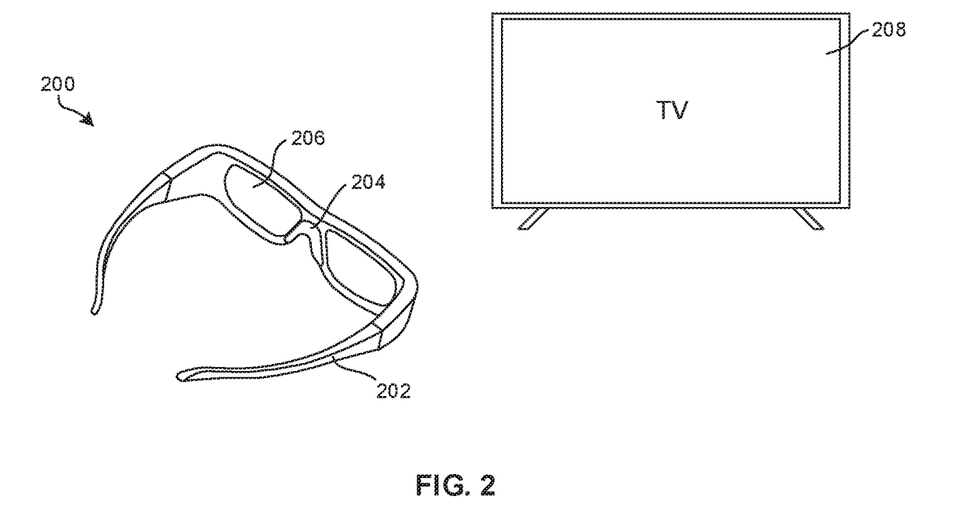
FIG. 2 illustrates an example smart glasses which may be used to view objects including overlaying objects onto images seen on a display such as a TV.

FIG. 2 illustrates a head-worn apparatus 200, in the example shown configured as smart glasses with left and right temples 202, a bridge 204, and left and right see-through displays 206 onto which images may be projected or otherwise established. A viewer may view images through the displays 206 shown on a display such as a TV 208. The head-worn apparatus 200 may be instantiated by contact lens form factors.

Figure 3:
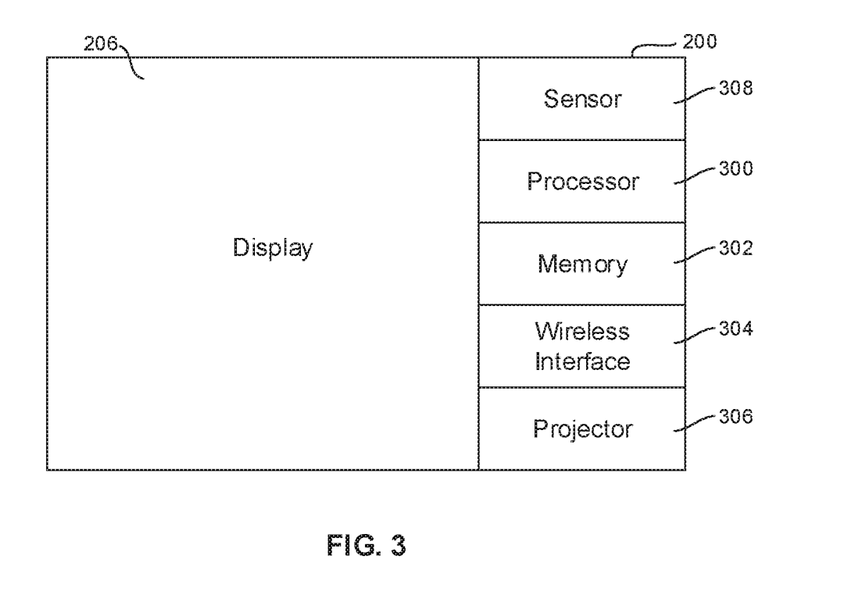
FIG. 3 is a block diagram of internal components of the smart glasses.

FIG. 3 illustrates that the head-worn apparatus 200 may include one or more processors 300 accessing instructions and data on one or more computer memories 302 and communicating with other devices using one or more wireless transceivers 304 such as any of the transceivers described herein. The processor 300 may control one or more projectors 306 to present images on the display(s) 206. The processor 300 may receive input from one or more sensors 308 such as any of the sensors described herein, including cameras (both inward-looking and outward-looking) and microphones.

Figure 4:
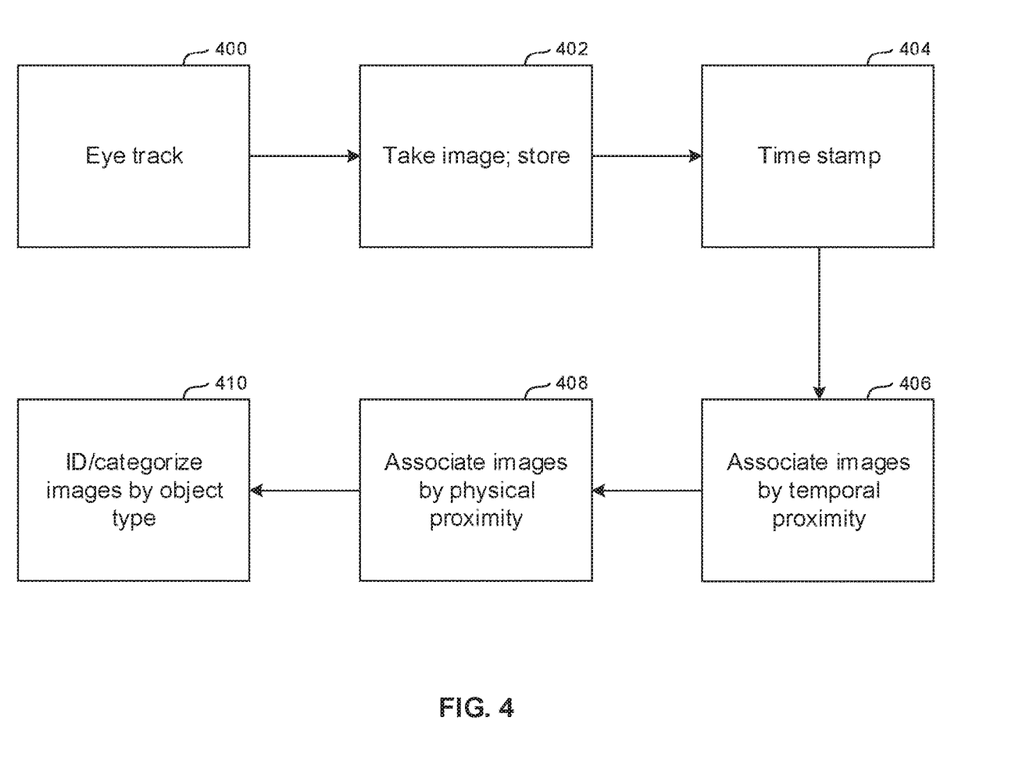
FIGS. 4 and 5 illustrate in example flow chart format example logic consistent with present principles.

FIG. 4 illustrates logic that may be executed by a processor on the smart glasses and/or a processor in the cloud communicating with the smart glasses. Commencing at block 400, a camera on the eyeglasses may image the wearer's eyes and send the images to an onboard or cloud processor to execute eye tracking. If desired, this eye tracking may be used at block 402 when imaging the space around the glasses as the wearer proceeds through his day. The images may be taken with the same or a different imager than the imager used for eye tracking. Images may be taken centered on the direction of the user's gaze. To this end the outward-facing imager may be movable on the glasses.

Moving to block 404, some or all images of the surroundings may be time stamped. Moreover, at block 406, if desired images may be associated with each other based on temporal proximity as indicated by the timestamps.

Proceeding to block 408, the images also may be associated with each other by the physical proximity of the spaces which they respectively represent. For example, images may be determined to be of proximate spaces based on a location of one image space being within a first distance of the location of another image space. The locations may be determined to be proximate based on the images sharing a similarity such as an image of another object. At block 410 the images may be identified and/or categorized by type of objects in the images using image recognition. The images may be stored locally on the smart glasses and/or uploaded to a web storage server.

The image recognition and classification above may be executed using a machine learning algorithm such as a neural network (NN). An input training set may be used to train a NN using pre-classified object images.

Figure 5:
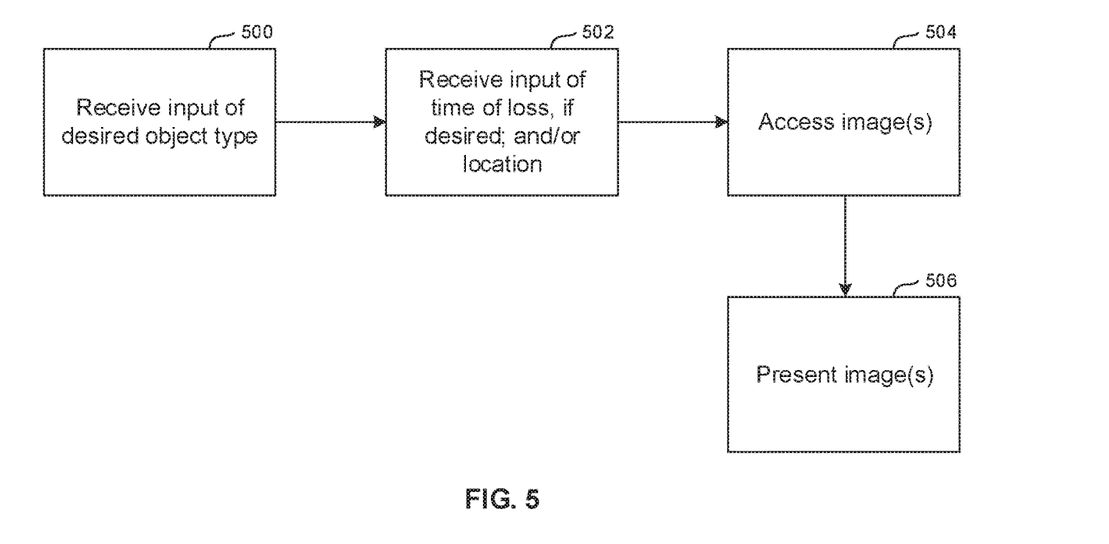

FIG. 5 illustrates subsequent logic. Commencing at block 500, suppose the wearer of the smart glasses has lost an object. He may speak the name of the object, which may be detected by a microphone on the smart glasses and processed using speech recognition. If desired, at block 502 indicates that input of approximate time of loss and/or location of loss may be received. Even if such information is not input, the logic may move to block 504 to access images with objects matching the input at block 500. Time/location, if input at block 502, may be used to winnow the images returned at block 506 by presenting the images on a display of the smart glasses.

Figure 6:
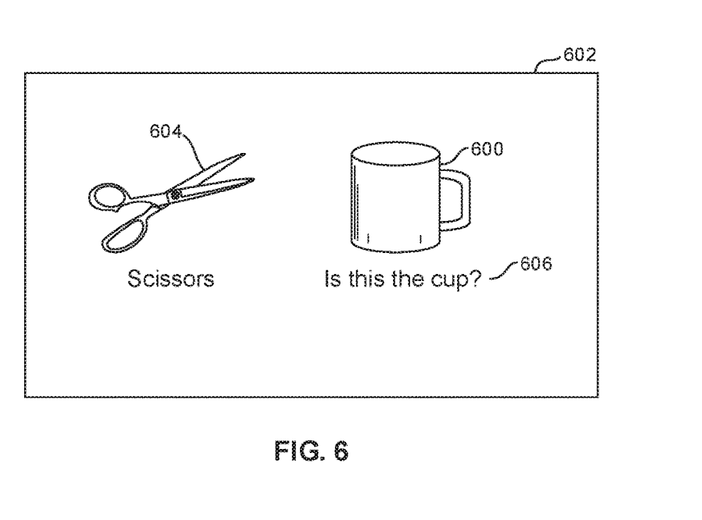
FIG. 6 illustrates an example screen shot consistent with present principles.

To aid the wearer in locating the lost object particularly when no location or time of loss is known, using the correlations from FIG. 4 images of additional objects that were not part of the query may be presented, based on the images of the additional objects being close temporally to the image of the desired object and/or being images of spaces physically close in space to the space in the image of the desired object. FIG. 6 illustrates.

As shown, an image 600 of a queried-for object, in this example, a green cup, is presented on a display 602 of the smart glasses. Also, an image 604 of an object not queried for, in the example shown, scissors, also is presented according to logic herein. This is but one example of an indication of a location of the queried-for object. A prompt 606 may be presented as to whether the image 600 is of the desired object, and if the user returns "no" the logic may repeat by returning and presenting another image.

Figure 7:
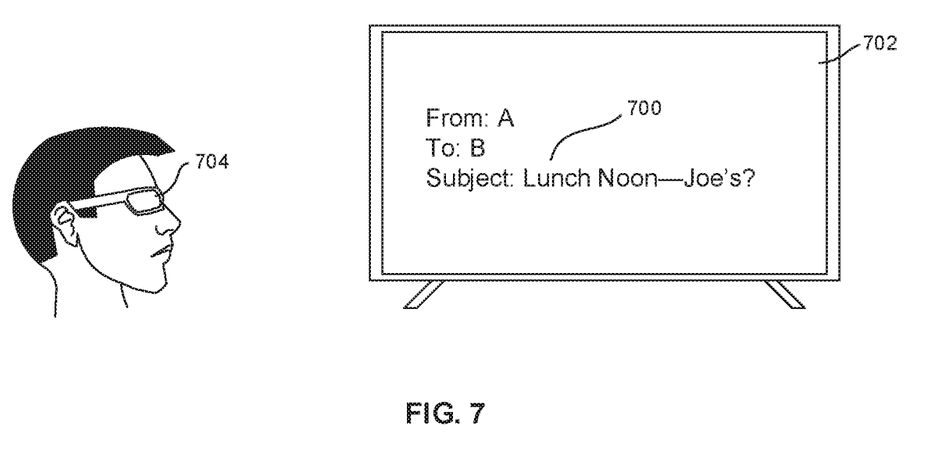
FIG. 7 illustrates a use case example of imaging text on a computer display.
Figure 8:
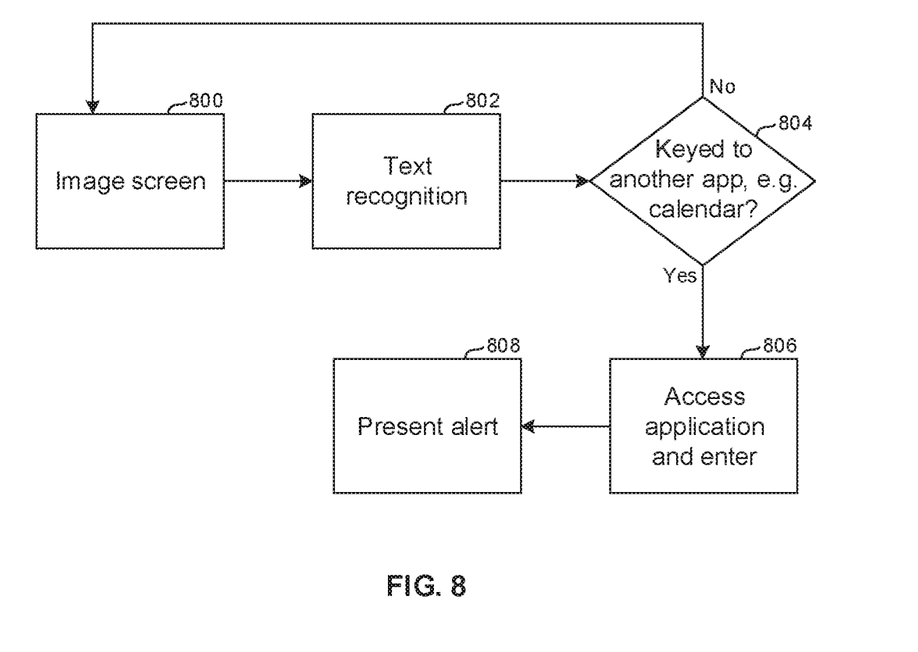
FIG. 8 illustrates in example flow chart format example logic consistent with FIG. 7.

FIG. 7 shows that in another example embodiment, text 700 such as an email presented on a display 702 may be imaged by the imager on the smart glasses 704. FIG. 8 illustrates the imaging step of the display 702 at block 800, sowing logic that may be performed by a processor on the smart glasses 704 or by another processor. Moving to block 802, text recognition is executed on the text to determine the nature and subject of the text. Decision diamond 804 indicates that based at least in part on the text recognition, it is determined whether the text implicates an application, such as a calendar application. If so, the application may be automatically accessed and executed at block 806 by, for example, entering identify at least one application to process text. Alternatively, or in addition, at block 808 an alert may be presented on the smart glasses that the text being imaged on the display 702 may pertain to an application.

Machine learning may be used in the logic of FIG. 8. A training set of terms, text layouts, etc. may be input to, for example, a NN to train the NN what applications pertain to particular terms, layouts, etc. in text.

Figure 9:
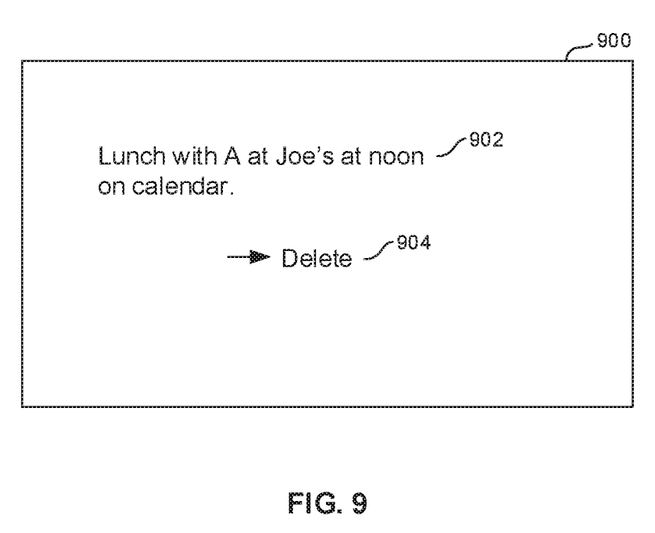
FIG. 9 illustrates an example screen shot consistent with FIGS. 7 and 8.

FIG. 9 illustrates further. All or part of the text imaged on the display 702 may be reproduced on a display 900 of the smart glasses, along with an advisory 902 that the text has been added or otherwise used in an application, in the example shown, added as an entry in the user's calendar. A selector 904 may be presented and may be selected to delete the action indicated.

It will be appreciated that whilst present principals have been described with reference to some example embodiments, these are not intended to be limiting, and that various alternative arrangements may be used to implement the subject matter claimed herein.

What is claimed is:

1. An assembly comprising:
  at least one head mount wearable on a head of a user;
  at least one imager on the head mount configured to generate images of objects; and
  at least one processor configured with instructions to:
  access the images responsive to a query for a first object;
  present a first image of at least the first object on at least one display of the head mount in response to the query;
  identify at least a second image of at least a second object that is not subject to the query, the identify being responsive to the query for the first object; and
  present the second image on the display along with the first image.

2. The assembly of claim 1, wherein the instructions are executable to:
  correlate images with respective timestamps; and
  identify the second image at least in part based on a timestamp of the second image being within a first time period of a timestamp of the first image.

3. The assembly of claim 1, wherein the instructions are executable to:
  correlate images with respective locations; and
  identify the second image at least in part based on a location of the second image being proximate a location of the first image.

4. The assembly of claim 3, wherein the instructions are executable to determine the second location is proximate the first location at least in part based on the second location being within a first distance of the first location.

5. The assembly of claim 3, wherein the instructions are executable to determine the second location is proximate the first location at least in part based on the first and second images sharing at least one similarity.

6. The assembly of claim 5, wherein the similarity comprises an image of a third object.

7. An assembly comprising:
  at least one head mount wearable on a head of a user;
  at least one imager on the head mount configured to generate images; and
  at least one processor configured with instructions to:
  access the images;
  execute text recognition on at least some of the images; and
  based at least in part on the text recognition, identify at least one application to process text.

8. The assembly of claim 7, wherein the application comprises a calendar application.

9. The assembly of claim 7, wherein the instructions are executable are executable to automatically execute the application responsive to the text recognition.

10. The assembly of claim 7, wherein the instructions are executable are executable to present a query to open the application responsive to the text recognition.

11. A method, comprising:
  receiving a query for a first object but not for a second object;
  responsive to the query, presenting an image of the first object on a head-mounted display; and
  responsive to the query, presenting an indication of a location of the first object, wherein the indication comprises an image of the second object.

12. The method of claim 11, wherein the head-mounted display is part of a smart glasses.

13. The method of claim 12, wherein the images are generated by an imager on the smart glasses.

14. The method of claim 11, comprising:
  correlating images with respective timestamps; and identifying the second image at least in part based on a timestamp of the second image being within a first time period of a timestamp of the first image.

15. The method of claim 11, comprising:

correlating images with respective locations; and identifying the second image at least in part based on a location of the second image being proximate a location of the first image.

16. The method of claim 15, comprising determining the second location is proximate the first location at least in part based on the second location being within a first distance of the first location.

17. The method of claim 15, comprising determining the second location is proximate the first location at least in part based on the first and second images sharing at least one similarity.

18. The method of claim 17, wherein the similarity comprises an image of a third object.

* * * * *